Sept. 4, 1923. 1,467,211
C. WAGNER ET AL
DRYING APPARATUS FOR PLATES OF METAL AND OTHER MATERIAL
Filed Nov. 24, 1919    4 Sheets-Sheet 1
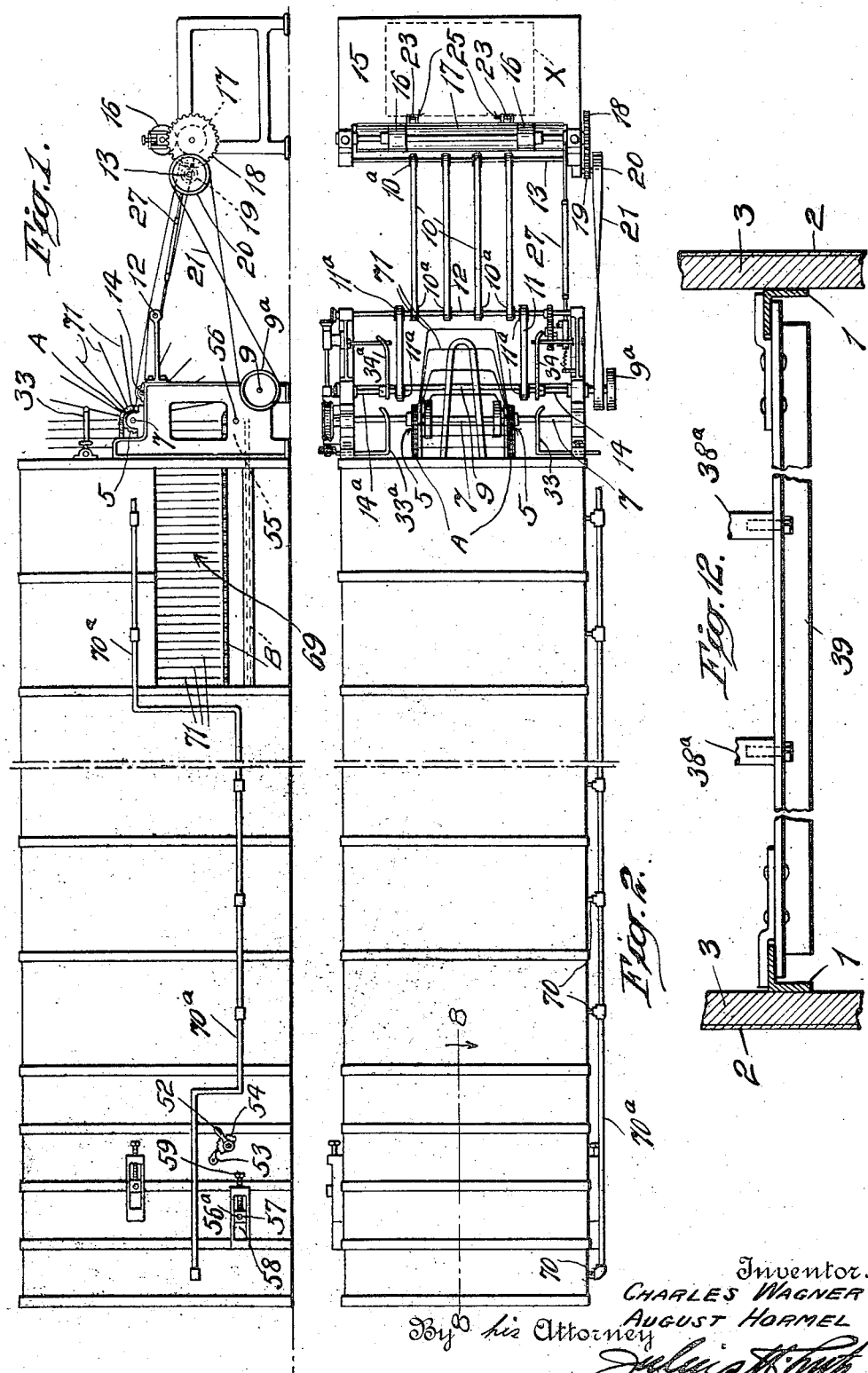
Inventors
CHARLES WAGNER
AUGUST HORMEL
By his Attorney

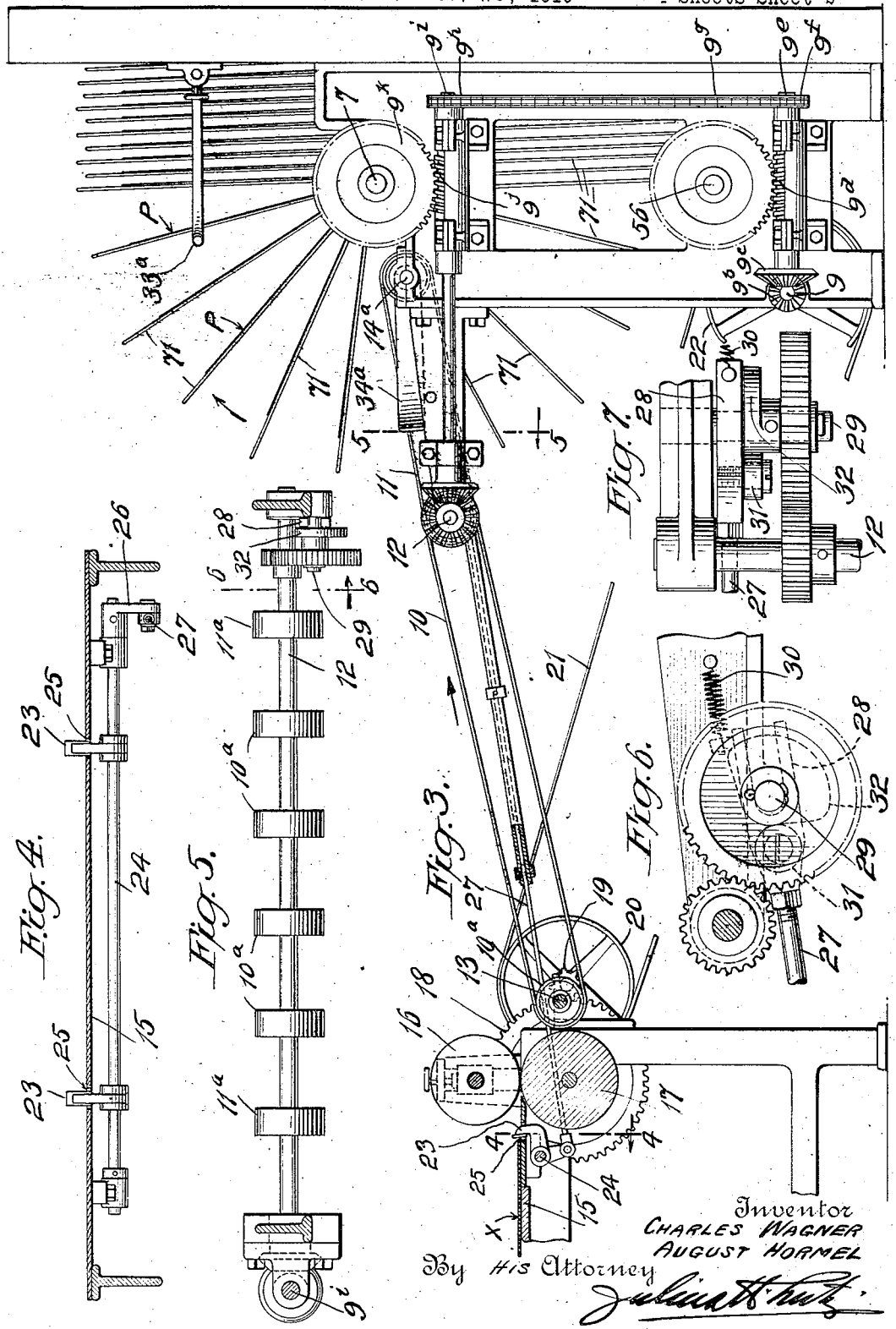

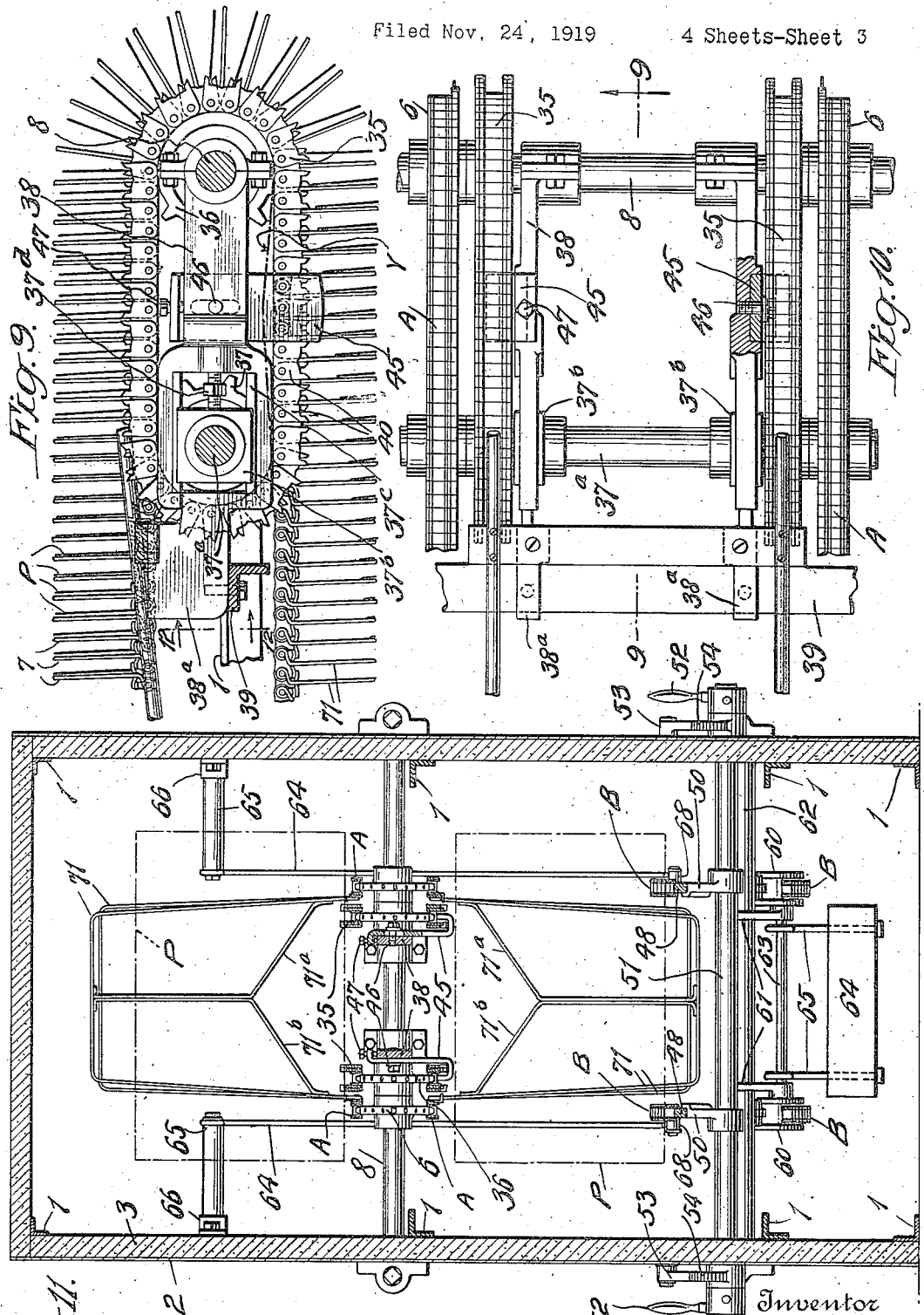

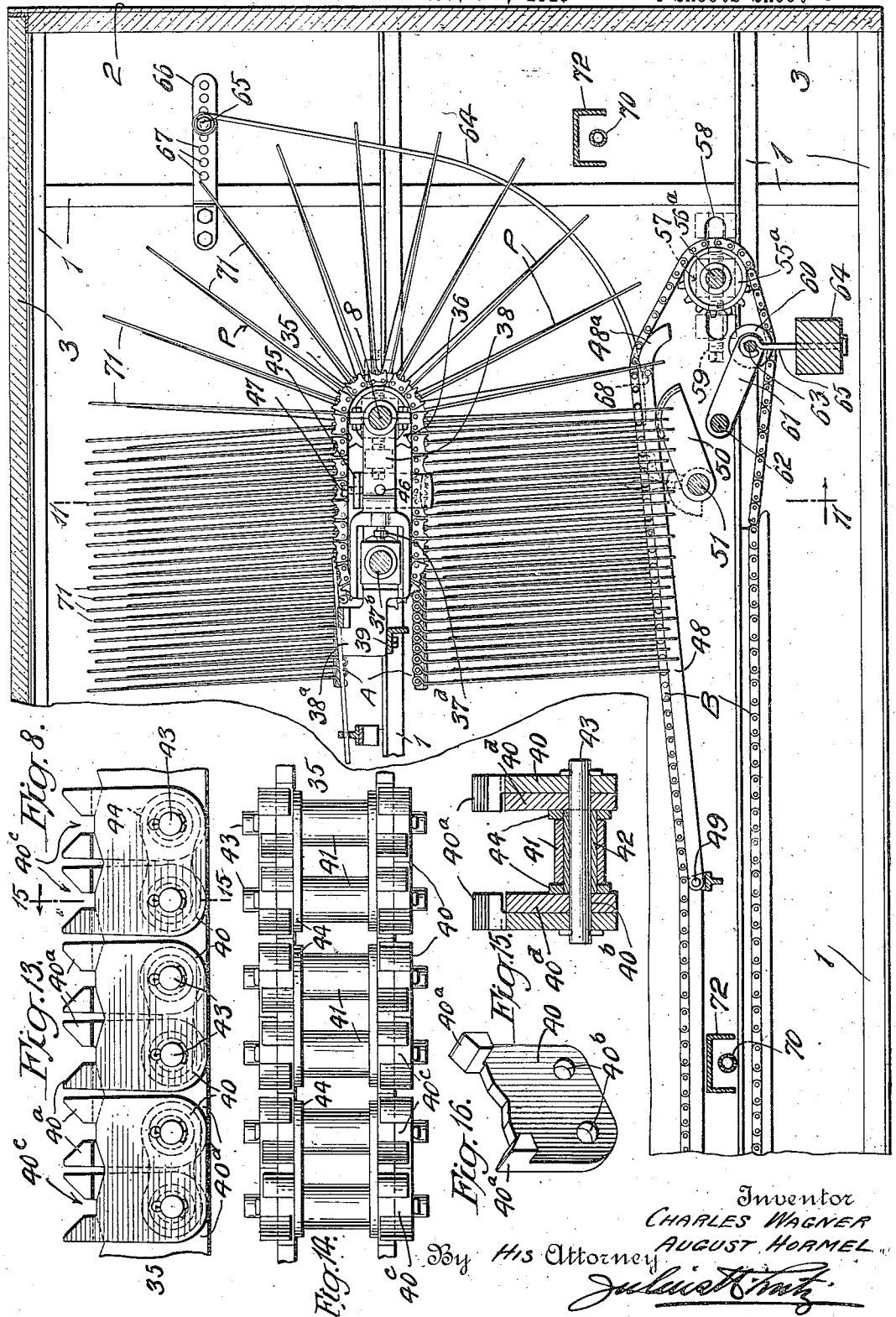

Patented Sept. 4, 1923.

1,467,211

UNITED STATES PATENT OFFICE.

CHARLES WAGNER, OF GRANTWOOD, NEW JERSEY, AND AUGUST HORMEL, OF NEW YORK, N. Y.

DRYING APPARATUS FOR PLATES OF METAL AND OTHER MATERIAL.

Application filed November 24, 1919. Serial No. 340,201.

*To all whom it may concern:*

Be it known that we, CHARLES WAGNER and AUGUST HORMEL, both citizens of the United States, and residents, respectively, of Grantwood, in the county of Bergen and State of New Jersey, and New York city, in the county and State of New York, have invented certain new and useful Improvements in Drying Apparatus for Plates of Metal and Other Material, of which the following is a specification.

This invention relates to improvements in drying apparatus for plates of metal and other material.

The present invention is an improvement upon the apparatus described in applicants' Letters Patent No. 1,293,261 of February 4th, 1919 for drying apparatus for sheet metal plates.

One object of this invention is the provision in a drying apparatus comprising an elongated enclosed and heated casing having plate carriers and conveying means movable therethrough in opposite directions of means for feeding the plates synchronously to carriers mounted upon one of said chains.

Another object of our invention is to provide means in a drying apparatus having spaced upper and lower conveyor chains moving synchronously in opposite directions of compensating means applied to the lower belt for handling and transferring from one chain to the other, without an excessive drop, plates of varying sizes.

Another object of our invention is to provide means for automatically compensating for any slack in the conveyor chains due to the varying of the path of travel in order to handle plates of varying sizes.

Another object of our invention is to improve the gripping means of transfer chain to enable the same to retain the plates throughout a greater arc of movement and until the transferred plate reaches a position perpendicular with the chain to which it is to be transferred.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a side elevation of drying apparatus embodying my invention, part of the central portion thereof being broken away;

Fig. 2 is a plan view of the apparatus shown in Fig. 1;

Fig. 3 is an enlarged detail view in section of the feeding mechanism shown in Fig. 1.

Fig. 4 is a section on the line 4—4 of Fig. 3;

Fig. 5 is a section on the line 5—5 of Fig. 3;

Fig. 6 is an enlarged detail in section on the line 6—6 of Fig. 5;

Fig. 7 is a plan view of the mechanism shown in Fig. 6;

Fig. 8 is a section on the line 8—8 of Fig. 2, illustrating the transfer of plates from an upper to a lower belt;

Fig. 9 is an enlarged detail partly in section of the gripping belt operating mechanism shown in Fig. 8, the section being taken on the line 9—9 of Fig. 10;

Fig. 10 is a plan view of said mechanism;

Fig. 11 is a section on the line 11—11 of Fig. 8;

Fig. 12 is a section on the line 12—12 of Fig. 9, looking in the direction of the arrow;

Figs. 13 and 14 are side elevation and plan views, respectively, of the gripping jaws in the transfer belt employed by us;

Fig. 15 is a section on the line 15—15 of Fig. 13;

Fig. 16 is a detail in perspective of one of the jaws.

Referring now to these drawings, which illustrate a preferred embodiment of our invention, the plate-drying apparatus embodies the following elements:

The casing.

An elongated casing which, as shown, has a metal frame 1, a casing or cover of sheet metal 2 and a lining 3 of a suitable heat-resisting or insulating material such as asbestos. The casing is, as shown, closed at two sides, on top and at the rear end, while it has openings at the opposite or front end to permit the feeding and delivery of plates at the same end.

The heaters.

The casing may be heated in any suitable manner and is provided, as shown, with heaters comprising perforated pipes 70 constituting burners which receive gas or other suitable fuel from a supply-pipe 70ª. The burners pass through inverted U-shaped hoods 72 which assist in effecting a uniform diffusion of heat. These heaters are positioned at suitable intervals along the casing to provide a suitable degree of temperature to dry plates in the passage of the same through the casing.

The conveyor chains.

Mounted within the casing in suitable spaced relation to each other is a pair of endless conveyor chains A extending parallel to each other and adapted to convey plates in one direction or rearwardly, and also suitably mounted below the same in suitable spaced relationship thereto is another pair of conveyor chains B adapted to convey the plates in the opposite direction or forwardly.

As illustrated, the upper pair of chains A are so mounted at opposite ends upon sprocket wheels 5 and 6 fast on shafts 7 and 8, respectively, and the lower pair are mounted at opposite ends upon sprockets 55 and 55ª fast upon shafts 56 and 56ª. The shaft 7 is, as illustrated, driven synchronously with the shaft 56, as shown, from a power shaft 9. The said power shaft 9 is rotated from any suitable source of power such as the pulley 9ª and transmits power through the intermeshing bevelled gears 9ᵇ—9ᶜ to the worm 9ᵈ on the shaft 9ᵉ, on which is mounted a sprocket 9ᶠ which transmits through the chain 9ᵍ to the sprocket 9ʰ on the shaft 9ⁱ, on which shaft 9ⁱ is mounted a worm 9ʲ which meshes with the worm wheel 9ᵏ mounted on the shaft 7. It will be obvious that this transmission causes the shafts 7 and 56 to rotate synchronously in opposite directions for the purpose of driving the chains A and B.

The carriers.

The upper pair of conveyor belts have suitably mounted thereon a plurality of carriers 71 which, as shown, comprise frames preferably formed of a strand of wire connected at its opposite ends to the opposite members of the pair of chains and bent intermediate its ends substantially rectangular in conformation. Said frame preferably has wire reinforcements 71ª—71ᵇ secured at one end to the top of the wire frame 71, then extending vertically for the major portion of the height of the frame and then spreading outwardly in opposite directions with the opposite ends secured to the opposite sides of the frame 71.

The feed mechanism.

Suitable plate-feeding mechanism is arranged at the front of the machine and such mechanism is provided with means for timing or synchronizing the movement of the plates to correspond with the movement of the carriers. As shown, this feed mechanism comprises feed belts 10 and 11 which are mounted upon pulleys 10ª—11ª, the lower pulleys being mounted upon shaft 13 and the upper belts being mounted at one end upon the shaft 12 and at the opposite end upon stub shafts 14—14ª. These shafts are, as illustrated, driven from the worm shaft 9ⁱ which also drives the conveyor belt shaft 7. The lower feed belt 10 extends at one end contiguous to a table 15 on which are mounted rollers 16 and 17 which are, as illustrated, rotated by means of a gear 18 which is in turn rotated by means of a pinion 19 which is in turn rotated by pulley 20 by means of belt 21 to pulley 22 on the power shaft 9. Mounted in suitable relationship to the continuously rotated feed rollers 16 and 17 so as to intermittently obstruct and free the path thereto is a pair of pawls or dogs 23 which, as illustrated, are mounted on a shaft 24 below the table and the noses of such pawls or dogs 23 extend through openings or slots 25 in the table. Intermittent motion is communicated to these dogs by rocking the shaft 24. This shaft is so rocked by means of an arm 26 mounted at one end thereof which is connected at its opposite end with an adjustable rod 27 which extends forwardly and has at its opposite end a yoke 28 fitting over a stub shaft 29. The yoke 28 is yieldingly moved forwardly by means of a spring 30 and is also provided with a roller 31. Fixed on the shaft 29 over which the yoke fits is a cam 32 which, when the shaft 29 is rotated, contacts with the roller 28 and forces the same rearwardly against the action of the spring 30 and thus moves the arm 27 to rock the pawl or dog 23 through the aperture 25 and into its blocking and freeing positions respectively. When the said pawl is in its blocking position it will be obvious that a plate cannot be fed through the feed rollers 16 and 17 and when the path to such rollers is freed a plate X may be fed through such rollers. The movement of the pawls 23 is synchronized with the movement of the carrier 71, as shown, by the cam 32 so that when the dogs are withdrawn and the plate is fed through the rollers 16—17 the carriers will be in proper position to receive and convey the same.

It will be seen that the lower feed belts 10 are four in number, and positioned directly in front of and in alignment with the carrier frames, while the upper belts 11 are positioned at opposite sides of such carriers, thus permitting a deeper and more positive feeding of the plates between the spaced carriers. As illustrated, the entrance portion of the machine is provided with side guides 33—33ª and 34—34ª which are, respectively, positioned in different planes and are adapted to align the plates transversely in relation to the carriers.

It is obvious that when a plate P is fed through the rollers and deposited by the feed belts upon a carrier, that the rotation of the conveyor belt will convey such a plate along the same to the opposite end of the casing.

The transfer belts.

At the rear end of the casing is mounted in parallelism with the conveyor belt A a pair of transfer belts 35, which, as shown, are mounted at one end upon sprockets 36 and at the other end upon sprockets 37. The sprocket 36, as illustrated, is mounted upon a stationary shaft 8 and the sprocket 37 is, as illustrated, mounted upon an adjustable shaft 37$^a$ journaled in blocks 37$^b$ which are mounted in ways 37$^c$, adjustment being made by the screw 37$^d$. These ways are formed integrally with a cross beam 38 which is connected at one end with the bearing of the stationary shaft 8 and at its opposite end is provided with a rearward extension 38$^a$ which is fixed to a cross bar 39 which is slidingly supported upon the frame 1 of the machine.

This construction permits adjustment between the stationary shaft 8 and movable shaft 37$^a$ for the purpose of bending the chain 35 for a purpose which will be hereinafter described. The chain 35 is composed of a series of pivoted gripping members, each of which is formed of sleeves 41 turning on bushings 42 which are mounted on pins 43. Adjoining pins are connected in pairs by links 44 to form one of the chain gripping members. The pins 43 protrude beyond the links 44 at both ends and upon the protruding ends of each member is mounted a pair of gripping links 40 having a pair of jaws 40$^a$ projecting toward each other so that the central lines of such jaws lie in the same plane. Upon the adjoining pins of each adjoining member pair are mounted additional gripping links 40$^d$. These links 40$^d$ are in all respects similar in conformation to links 40 shown in Fig. 16, and overlap the links 40 and are similarly apertured as at 40$^b$. Owing to the overlapping arrangement of links, each of the jaws will be opposed to a cooperating jaw. While the chain 35 is in horizontal position the members of a pair of cooperating jaws will be spaced from each other to form gaps 40$^c$ for the reception of the lower edge of the plate P, but when the chain makes a turn around its sprocket wheel, the jaws will close upon the plate and carry the same along with it during the entire arc of the turn. When this turning movement ceases and the chain again resumes its horizontal position, the jaws automatically open to release the plate and drop the same upon the pair of chains B.

Transfer-arc increasing means.

It has been found in practice that the gripping jaws, when mounted as above described, frequently drop a plate before it reaches a position perpendicular to the lower chains B and in order to increase the transferring arc through which the plates are gripped and carried by the transfer chains 35, we preferably provide means for bending the lower section of the transfer chains 35 into the position shown by the dotted line Y in Fig. 9.

As illustrated, the means for accomplishing this result comprise bars 45 which are adjustably mounted upon the beam 38 by means of adjustable slot and pin connections 46 and the said bars may be positively moved to bend the said chain by means of screws 47. As shown, the lower end of the bar 45 is provided with a hook which extends around one portion of the chain, the hooked end of which abuts against the sleeves 41 of the chain 35. It will be apparent that the gripping chain when bent in this manner will cause the gripping jaws to retain their grip upon the plates until the latter reach a position perpendicular to the belt B.

When the plates are so released they will be dropped upon the lower conveyor chains and will be retained thereon in substantial vertical position by the carriers 71 which extend into proximity thereto and preferably between and below such chains.

Distance-varying means.

It is desirable that a machine of this character shall be able to handle plates of varying sizes, and obviously plates which are much shorter than the distance between the upper and lower chains, unless suitable means for varying the distance between the chains at some portion thereof be provided, will necessarily be dropped a considerable distance on to the lower belt. This dropping of plates is undersirable and in order to obviate the same, we provide means for raising the lower chain relatively to the upper transfer chain when it is necessary to handle plates of less height than the normal distance between the chains. For this purpose, we preferably provide each of the chains B at the rear end thereof with bending levers 48 which, as shown, are pivoted at 49 and have at their rear free ends a curved portion 48$^a$. The levers 48 may be raised and lowered by any suitable mechanism and, as shown, they are so raised by cams 50 mounted upon a shaft 51 which is rotated by means of handles 52 and is retained in any suitable position by means of ratchets 54 mounted upon said shaft and pawls 53 suitably mounted on the casing and cooperating with said ratchet. In order to permit a raising of the chains B by the levers 48, the sprockets 55 upon which the rear end of the chains B are mounted are shiftable backwardly and forwardly. As shown, said sprocket is mounted on the shaft 56 which is journalled in a block 57 movable in the slot 58 by means of a screw 59. This enables an initial adjustment of the slack of the chains B and permits the raising of a portion of the chains by the levers 48.

Slack take-up means.

It is desirable, however, in some cases that the slack of the chain be taken up or compensated for automatically when the distance between chains A and B is increased, and for this purpose we preferably provide weighted rollers 60 on the lower run or section of the chains B and in contact with the upper surface thereof. These rollers 60 swing freely from arms 61 mounted upon a shaft 62. These rollers, as shown, are mounted upon a shaft 63 and a weight 64 is connected thereto by hooks 65. The effect of this mechanism is to automatically take up the slack of the chains B when the same become slack for any reason.

Adjustable transfer guiding device.

Under some conditions a plate, during the transfer thereof from one belt to the other, becomes loosened from the gripping members of the transfer chain and it is desirable to guide any such plates without marring the same on to the chains B. Heretofore a stationary guide was provided which was suitable only for one size of plate. In order to provide for varying sizes of plates, however, we preferably in our present invention employ adjustable guide rods 64 which, as shown, are pivoted at 65 on a bracket 66 having a series of adjusting apertures 67 to permit lateral adjustment, and these rods 64 are curved downwardly and have their lower curved ends free and resting upon rollers 68 mounted upon levers 48 so as to cooperate therewith and to be automatically movable vertically thereby.

After the plates are transferred as above described they pass forwardly on the conveyor chains B to the opening 69 at one side of the machine through which the same may be removed in dried condition.

Having described our invention we claim:

1. In a drying apparatus, the combination with a pair of main conveyor chains, of plate carriers mounted to bridge said pair of chains, an endless horizontally-disposed transfer chain mounted at its front and rear ends on suitable sprockets adjacent to said main chains; gripping devices on said transfer chain adapted to open to release plates during its horizontal movement and to close to grip plates during its arcuate movement about the sprockets and means for bending said transfer chain to increase its arcuate movement and prolong its gripping period.

2. In a drying apparatus, the combination with a pair of main conveyor chains; plate carriers mounted to bridge said pair of chains, another pair of auxiliary chains mounted adjacent to said main pair of chains and synchronized therewith; an endless horizontally-disposed transfer chain mounted at its front and rear ends on suitable sprockets adjacent to said main chains; gripping devices on said transfer chain adapted to open to release plates during its horizontal movement and to close to grip plates during its arcuate movement about the sprockets and means for bending said transfer chain to increase its arcuate movement and prolong its gripping period.

3. In a drying apparatus, the combination with a pair of main conveyor chains; plate carriers mounted to bridge said pair of chains, another pair of auxiliary chains mounted adjacent to said main pair of chains and synchronized therewith; means for transferring plates from one chain to the other and means for bending one of said pairs of chains toward the other to vary the distance therebetween and permit handling of the varying sizes of plates.

4. In a drying apparatus, the combination with a pair of main conveyor chains; plate carriers mounted to bridge said pair of chains, another pair of auxiliary chains mounted adjacent to said main pair of chains and synchronized therewith; means for transferring plates from one chain to the other, means for bending one of said pairs of chains toward the other to vary the distance therebetween and permit handling of the varying sizes of plates and means for automatically taking up the slack on one of such pairs of chains.

5. In a drying apparatus, the combination with a pair of main conveyor chains; plate carriers mounted to bridge said pair of chains, another pair of auxiliary chains mounted in spaced relationship to said main pair of chains and a plate-guiding device positioned adjacent to the space between said chains at one end thereof and adapted to guide ungripped plates from one pair of chains to the other and to be adjustable toward and away from said chains to effectively guide plates of varying sizes.

In witness whereof, we have signed our names to the foregoing specification in the presence of two subscribing witnesses.

CHARLES WAGNER.
AUGUST HORMEL.

Witnesses:
FREDERICK P. RANDOLPH,
STALLO VINTON.